Figure 1:
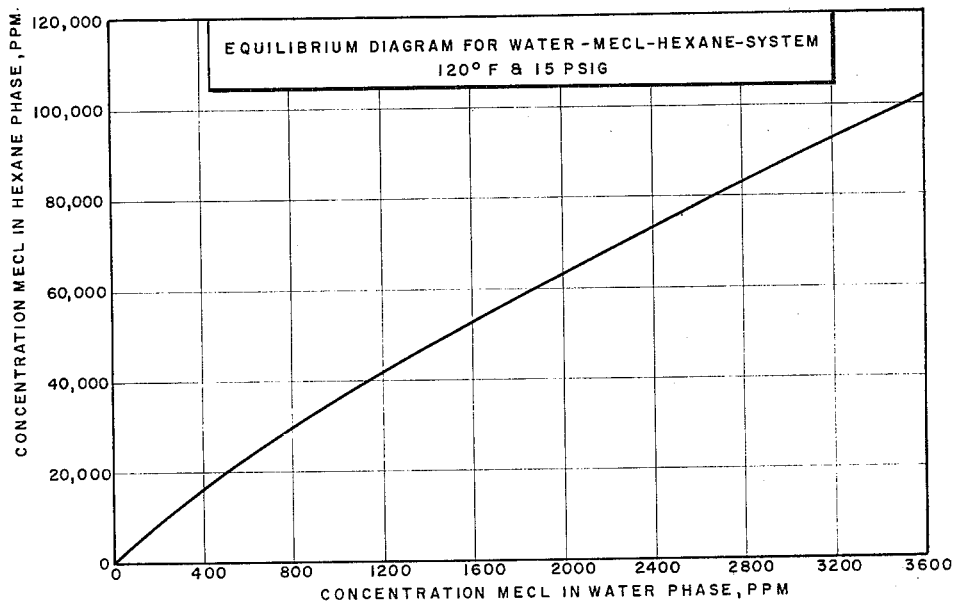

Nov. 9, 1965  J. M. BONEM  3,217,049

RECOVERY OF METHYL CHLORIDE

Filed March 4, 1963

INVENTOR.
JOSEPH M. BONEM,
BY
ATTORNEY.

United States Patent Office 3,217,049
Patented Nov. 9, 1965

3,217,049
RECOVERY OF METHYL CHLORIDE
Joseph M. Bonem, Baytown, Tex., assignor, by mesne assignments, to Esso Research and Engineering Company, Elizabeth, N.J., a corporation of Delaware
Filed Mar. 4, 1963, Ser. No. 262,627
6 Claims. (Cl. 260—652)

The present invention is directed to a method for recovering a halogenated hydrocarbon. More particularly, the invention is directed to recovering a volatile halogenated hydrocarbon from a large excess of water containing same. In its more specific aspects, the invention is concerned with extracting a holagenated hydrocarbon from a large excess of water containing the halogenated hydrocarbon with a hydrocarbon solvent.

The present invention may be briefly described as a method for recovering a volatile halogenated hydrocarbon such as methyl chloride from a large excess of water containing same in which the water containing the halogenated hydrocarbon is extracted with a hydrocarbon solvent under conditions to form a hydrocarbon extract phase and an aqueous raffinate phase. The extract phase is treated, such as by distillation, to recover the halogenated hydrocarbon therefrom.

The halogenated hydrocarbon recovered in the practice of the present invention is preferably methyl chloride, but other halogenated hydrocarbons may be recovered such as ethyl chloride, propyl chloride, butyl chloride and carbon tetrachloride, and the like.

The halogenated hydrocarbon is present in the water in a very small amount such that a large excess of water contains a relatively small amount of halogenated hydrocarbon. Specifically, the water may contain from about 300 to 4000 p.p.m. of the halogenated hydrocarbon such as methyl chloride and the like.

The feedstock of the present invention may result from a polymerization operation such as the polymerization of an isomonoolefin and a diolefin in the presence of a Friedel-Crafts catalyst at temperatures below about $-10°$ C. In such operations, an isomonoolefin, such as isobutylene, and a diolefin, such as isoprene or butadiene, are polymerized in the presence of aluminum chloride, preferably at a temperature of about $-140°$ F. The polymer is formed in a diluent such as methyl or ethyl chloride and this polymerized reactant body containing the polymer particles as a slurry is discharged into a flash tank wherein the volatile materials associated with the polymer are flashed into vapor. The vapors contain some steam and since it is necessary to remove all moisture from this recycle stream, the vapors are cooled to condense water. This water contains substantial amounts of the halogenated hydrocarbon, such as methyl chloride and the like. Since the water is ultimately discharged into a sewer, substantial quantities of the expensive halogenated hydrocarbon may be lost. For example, in one commercial operation, the methyl chloride content of a stream discharged from a butyl rubber operation contains about 1800 p.p.m. of methyl chloride. It is desirable to recover this methyl chloride in accordance with the present invention.

The methyl chloride may be recovered by an extraction operation in which a hydrocarbon solvent may be used to contact the aqueous solution containing the methyl chloride. The hydrocarbon solvent may suitably be a naphtha fraction boiling from about 90° F. to about 600° F., or it may be a fraction boiling at about 30° F. to 600° F. Such latter fraction may contain substantial amounts of butanes and the like. It is contemplated that substantially purified hydrocarbons may be employed as the solvent. As examples of these purified hydrocarbons may be mentioned n-butane, isobutane, n-pentane, isopentane, hexanes, heptanes, octanes, nonanes, and the higher members of the homologous series boiling up to about 600° F. The hydrocarbon fraction may suitably comprise paraffinic, aromatic, olefinic and naphthenic hydrocarbons. Purified naphthenic hydrocarbons such as cyclopentane, cyclohexanes and the like homologous compounds may also be used. Aromatic hydrocarbons such as benzene, toluene, xylenes, homologues, and mixtures thereof may be used.

The solvent-to-feed ratio of the feed employed in the present invention may vary from about 500–5000 pounds per hour of the solvent to about 30,000 pounds per hour of the aqueous stream. The solvent weight ratio may range from about 0.1–1.0:4–10.

Temperatures employed in the practice of the present invention may range from about 75° F. to 200° F. with pressures sufficient to maintain a liquid phase. A temperature of about 150° F. and a pressure of 15 p.s.i.g. are satisfactory.

The extraction operation is preferably conducted in an extraction zone comprising a packed tower. For example, a tower packed with Raschig rings and other similar packing material gives good results. In practicing the present invention in a packed tower, the height of a theoretical transfer unit (HTU) will vary from about 15 feet to 40 feet with desirable results obtained with an HTU of about 27 feet. The term "height of a theoretical transfer unit" has the following meaning: The height of a packing material necessary to attain complete equilibrium between the extract and raffinate phases.

Figure 2:
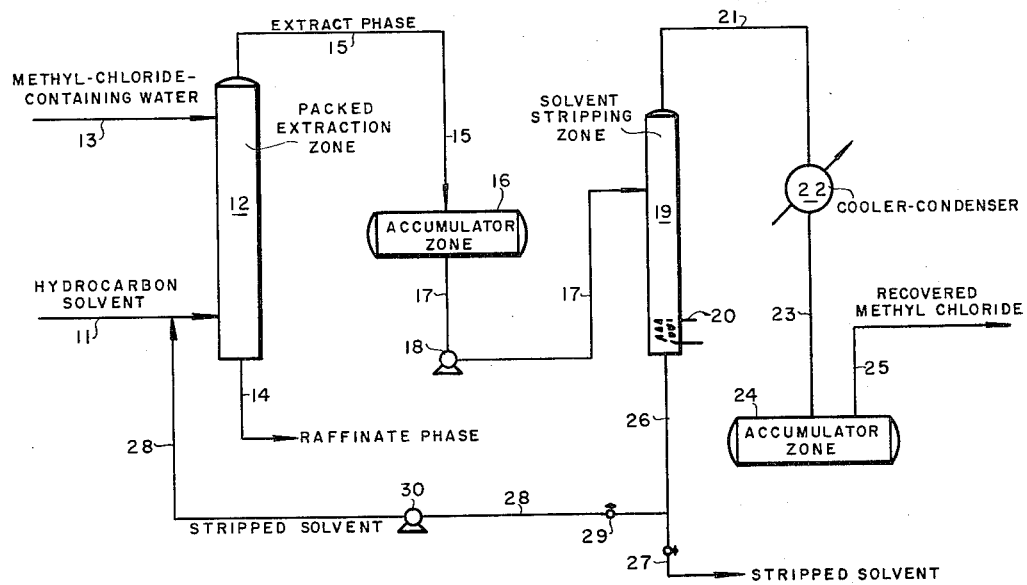

The present invention will be further illustrated by reference to the drawing in which:

FIG. 1 is an equilibrium diagram for the water-methyl chloride-hexane system; and FIG. 2 is a flow sheet of a preferred mode of practicing the present invention.

Referring now to the drawing and specifically to FIG. 2, numeral 11 designates a charge line by way of which a hydrocarbon solvent such as hexane is introduced into a packed extraction zone 12 from a source not shown. A methyl-chloride-containing aqueous stream containing about 1800 p.p.m. of methyl chloride from a butyl rubber polymerization system is introduced into extraction zone 12 by line 13 and is countercurrently contacted with the hydrocarbon solvent. By virtue of the conditions maintained in zone 12, a raffinate phase and an extract phase are formed. The raffinate phase is discharged from zone 12 by line 14 and the extract phase is withdrawn by line 15. The extract phase, consisting essentially of the hydrocarbon solvent and substantially all of the methyl chloride originally contained in the methyl chloride stream introduced into the system, is withdrawn by line 15 and discharged thereby into an accumulator zone 16. From accumulator zone 16, the hydrocarbon extract is withdrawn by line 17 and pumped by pump 18 into a solvent stripping zone 19, which suitably may be a distillation zone or a flashing zone. Conditions are adjusted in zone 19 by heating means, illustrated by steam coil 20, such that substantially all of the methyl chloride is removed from the extract and withdrawn by line 21, cooled and condensed in condenser 22, and discharged by line 23 into an accumulator zone 24 from whence recovered methyl chloride may be withdrawn by line 25 for further use as may be desired.

The stripped solvent is discharged by line 26 from zone 19 and may be withdrawn from the operation by opening valve 27. Preferably, however, valve 27 remains closed and the stripped hydrocarbon solvent is returned to line 11 by way of line 28, controlled by valve 29, through pump 30.

Since the water stream introduced by line 13 may contain a small amount of oil which is removed in extraction zone 12 with the extract, it may be desirable from time to time to discharge part of the stripped hydrocarbon by opening valve 27. Alternately, the stripped hydrocarbon may be withdrawn as a side stream for recycling to line 11 and a small amount of a bottoms fraction discharged to remove the oil from the system.

In order to illustrate the invention further, equilibrium data were obtained on the hexane-methyl chloride-water system at a temperature of 120° F. and a pressure of 15 p.s.i.g. These data are presented and shown graphically in FIG. 1 wherein the distribution coefficient (p.p.m. of methyl chloride in hexane recovered by p.p.m. of methyl chloride in water) was determined at about 32 for the system. Such favorable equilibrium conditions show that high recovery of methyl chloride is obtained by solvent extraction of the aqueous stream containing small quantities of methyl chloride. In Table I which follows, the particular figures for the equilibrium data are presented.

TABLE I

*Equilibrium data, hexane-MeCl—$H_2O$ system*

[T.=120° F.  P.=15 p.s.i.g.]

| Concentration, p.p.m. | | Distribution coefficient, $K=C_H/C_W$ |
|---|---|---|
| Conc. MeCl in water phase $C_W$ | Conc. of MeCl in hexane phase $C_H$ | |
| 384 | 14,870 | 38.6 |
| 730 | 28,470 | 39.0 |
| 971 | 36,620 | 37.7 |
| 1,134 | 41,690 | 36.8 |
| 2,725 | 97,600 | 35.8 |
| 2,973 | 87,560 | 29.5 |
| 3,219 | 92,500 | 28.7 |
| 3,267 | 105,400 | 32.3 |
| 334 | 11,150 | 34.4 |
| 838 | 31,100 | 37.1 |
| 1,119 | 37,000 | 33.0 |
| 1,461 | 50,400 | 34.5 |
| 1,574 | 51,000 | 32.4 |

It will be noted that the concentration of methyl chloride in water ranges from 384 to 3267 p.p.m. Thus, the distribution coefficients appear favorable for a range of methyl chloride in water from about 300 to about 4000 p.p.m.

In a specific example of the present invention, an aqueous stream in an amount of 31,003 pounds per hour is charged into the top of an extraction tower 85 feet tall and 2 feet in diameter, containing 69 feet of ½-inch Raschig rings as packing. The aqueous stream contains 30,967 pounds of water, 33 pounds of methyl chloride, and 3 pounds of oil. A hexane stream in an amount of 1550 pounds per hour is charged. This stream contains 1545 pounds of hexane and 5 pounds of methyl chloride, and is suitably a recycle stream. The extraction zone is operated at 150° F. and 15 p.s.i.g. An extract fraction in an amount of 1576 pounds per hour is withdrawn. This extract fraction contains 1536 pounds of hexane, 2 pounds of water, 35 pounds of methyl chloride, and 3 pounds of oil. A raffinate fraction is discharged in an amount of 30,977 pounds per hour. This raffinate fraction contains 30,965 pounds of water, 3 pounds of methyl chloride and 9 pounds of heptane.

The extract fraction is suitably distilled or stripped for recovery of the methyl chloride and recycle of the hexane to the extraction zone.

In operations of the nature described, from about 70% to 90% of the methyl chloride contained in the aqueous feedstock is recovered.

The feasibility of the present invention is further shown by the following distribution coefficients wherein naphtha boiling in the range from about 350° F. to about 450° F. is employed as the primary hydrocarbon solvent.

| Temperature: | Distribution coefficient [1] |
|---|---|
| 85 | 7.45 |
| 125 | 10.4 |
| 150 | 13.8 |

[1] Distribution coefficient=

$$\frac{\text{pounds of methyl chloride in the naphtha phase}}{\text{pound of methyl chloride in the water phase}}$$

From the foregoing, it is clear that the present invention is quite advantageous and useful in providing for the recovery of volatile halogenated hydrocarbons from an excess of water. Heretofore, it had not been appreciated or realized that valuable amounts of halogenated hydrocarbons are recoverable from aqueous streams containing such small amounts of the volatile halogenated hydrocarbons.

The nature and objects of the present invention having been fully described and illustrated and the best mode thereof set forth, what I wish to claim as new and useful and secure by Letters Patent is:

1. A method for recovering methyl chloride which comprises extracting an aqueous solution containing from about 300 to about 4000 p.p.m. of methyl chloride with a hydrocarbon solvent boiling from about 30° F. to about 600° F. at a temperature within the range from about 75° F. to about 200° F. in the liquid phase and at a solvent-to-aqueous solution weight ratio from about 0.1 to about 1.0:about 4 to about 10 to obtain a hydrocarbon extract phase and an aqueous raffinate phase, and recovering methyl chloride from said extract phase.

2. A method in accordance with claim 1 in which the hydrocarbon solvent boils within the range from about 90° F. to about 600° F.

3. A method in accordance with claim 1 in which the solvent comprises a butane.

4. A method in accordance with claim 1 in which the solvent is a hexane.

5. A method in accordance with claim 1 in which the solvent is a naphtha fraction.

6. A method in accordance with claim 1 in which the methyl chloride is recovered by distilling said extract phase.

References Cited by the Examiner

UNITED STATES PATENTS 3,148,041   9/64   Dehn et al. _____ 260—652

FOREIGN PATENTS 589,353   6/47   Great Britain.

OTHER REFERENCES

Hodgman: Handbook of Chemistry and Physics, 27th ed. (Chem. Rubber Publishing Co., 1943, QD 65 C 4) pages 665, 817, 884.

Othmer et al.: Ind. Eng. Chem., 35, pages 798–805.

Treybal, Liquid Extraction, 1st ed. (McGraw-Hill, 1951, TP 156, E 8 T (72), pages 80–81, 389–391.

LEON ZITVER, *Primary Examiner.*